United States Patent
Wagener et al.

[19]

[11] Patent Number: 6,069,321
[45] Date of Patent: May 30, 2000

[54] DEVICE FOR ATTACHING BUSBAR TO A SUPPORT RAIL

[75] Inventors: Hans Wagener, Dietzhölztal; Jürgen Zachrai, Dillenburg, both of Germany

[73] Assignee: Rittal-Werk Rudolf Loh GmbH & Co. KG, Herborn, Germany

[21] Appl. No.: 09/037,351

[22] Filed: Mar. 10, 1998

[30] Foreign Application Priority Data

Mar. 12, 1997 [DE] Germany .......................... 197 10 001

[51] Int. Cl.⁷ .............................. H02G 5/00; H02G 5/04
[52] U.S. Cl. ................... 174/99 B; 174/99 R; 174/68.2; 174/70 B; 174/149 B; 361/611; 361/637
[58] Field of Search .............................. 174/99 B, 99 R, 174/99 E, 100, 68.2, 70 B, 71 B, 72 B, 72 C, 133 B, 149 B; 361/611, 612, 613, 614, 637, 638, 639, 640, 648, 649, 650

[56] References Cited

U.S. PATENT DOCUMENTS

| | | | |
|---|---|---|---|
| 3,315,132 | 4/1967 | Lucas | 361/829 |
| 4,366,528 | 12/1982 | Cole | 361/831 |
| 4,419,715 | 12/1983 | Pear | 361/638 |
| 4,533,190 | 8/1985 | Booty | 439/110 |

FOREIGN PATENT DOCUMENTS 4005138  7/1991  Germany .

Primary Examiner—Kristine Kincaid
Assistant Examiner—Mark Olds
Attorney, Agent, or Firm—Pauley Petersen Kinne & Fejer

[57] ABSTRACT

A device for attaching busbars of square or rectangular cross section on a support rail using electrically non-conducting support elements, which can be connected with the support rail and form a busbar receptacle adapted to the cross section of the busbar. With a simple fastener, assembly is considerably simplified because two post-shaped supports per busbar can be attached as support elements on the support rail, wherein spacing between the supports is matched to the width of the busbar and a height is matched to the thickness of the busbar. A base plate is arranged between the two supports, which insulates the busbar receptacle against the support rail and which is captively held between the holders. The ends of the supports facing away from the support rail can be closed by a strip.

16 Claims, 1 Drawing Sheet

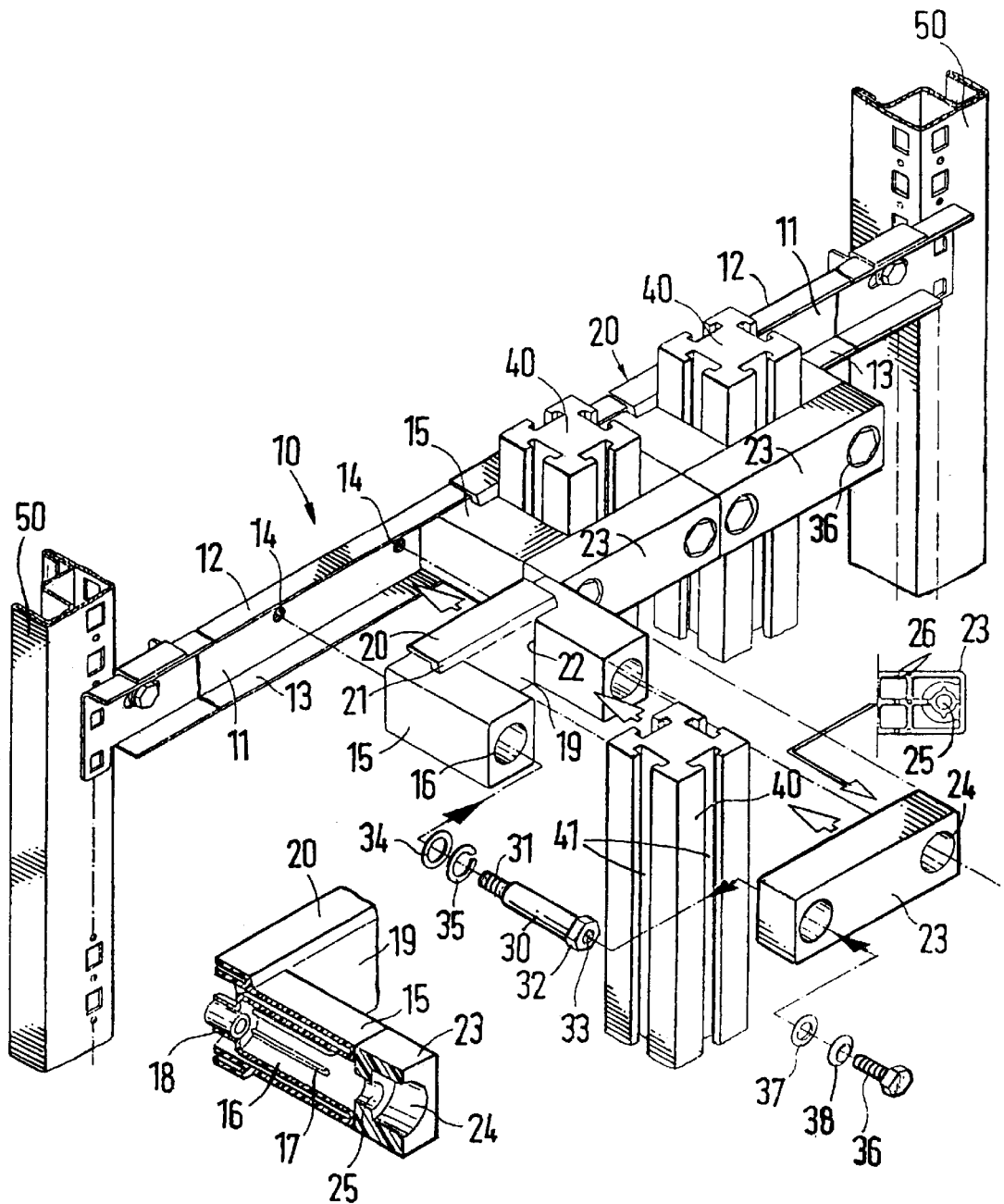

DEVICE FOR ATTACHING BUSBAR TO A SUPPORT RAIL

BACKGROUND OF THE INVENTION

1. Field of the Invention

This invention relates to a device for attaching busbars of square or rectangular cross section on a support rail by using electrically non-conducting support elements, which can be connected with the support rail and form a busbar receptacle adapted to the cross section of the busbar.

2. Description of Prior Art

It is important to be able to mount busbars in an insulated manner, very rapidly and definitely on the support rail, which is made of metal. Thus, it should be possible to employ simple support elements. This has not been optimally resolved in connection with known devices of the type mentioned above, since one of the desired aspects always was preferred.

SUMMARY OF THE INVENTION

It is one object of this invention to create a device of the type mentioned above, which permits a quick attachment of the busbars to the support rail by simple support and fastening elements, and which in the process assures a definite insulation against the support rail.

In accordance with this invention the above object is attained with two post-shaped supports per busbar that can be attached as support elements on the support rail, where spacing is matched to the width of the busbar and where a height is matched to the thickness of the busbar. A base plate is arranged between the two supports, which insulates the busbar receptacle against the support rail and which is captively held between the holders. The ends of the supports facing away from the support rail can be closed by a strip.

The post-shaped supports are fixed in place at matched distances on the support rail. Then the base plate is inserted between the supports and captively held there. The busbar is inserted into the open busbar receptacle and is held there by means of the strip connected with the supports. Thus the supports are also matched in height to the associated dimension of the busbar. Assembly can be rapidly performed in this way and the busbar receptacle is insulated in all directions by the support elements, namely the support, the base plate and a strip, made of an electrically non-conducting material.

In accordance with one embodiment of this invention, assembly is simplified by the supports having a square exterior cross section and being placed, fixed against twisting, in a support rail with a U-shaped cross section.

In accordance with a further embodiment of this invention, the fastening costs can be reduced because the supports have a screw receptacle which, facing the support rail, makes a transition via a step into a fastening sleeve reinforced by an inserted metal sleeve. A fastening screw, which ends in a threaded part matched to the fastening sleeve and which can be screwed into a threaded bore of the support rail, can be inserted into the screw receptacle. The fastening screw has a threaded receptacle for the strip fastening screw in the screw head facing the strip. In addition, these types of fastening screw assure simple pre-assembly of the supports.

For improving the screw connections, in one embodiment of this invention the fastening screw is supported on the fastening sleeve of the support by a shim plate and a spring washer. The strip fastening screw is supported via a shim plate and a spring washer flush in a strip receptacle having a countersink.

If the support is embodied as a hollow body around the screw receptacle and the fastening sleeve, the supports can be manufactured as simple and cost-efficient plastic injection-molded parts.

The insertion of the fastening screws into the support, while maintaining their free rotatability, is made easier and improved because the screw receptacle has longitudinally-oriented guide strips, which reduce the diameter of the screw receptacle to the shank diameter of the fastening screw, but do not occupy the section for receiving the screw head.

The captive fastening of the base plate on the two supports fastened on the support rail is simplified because the base plate is designed in an H-shape, and with leg projections at least partially covers the exteriors of the adjoining supports extending parallel with the longitudinal direction of the support rail.

If the base plate is equipped with cover sections on the leg projections facing the support rail, which cover the exteriors of the lateral legs of the U-shaped support rail, the busbar receptacle is completely insulated against the support rail.

The production of the strip is also simplified and less expensive because the strip is recessed around the strip receivers on the side facing the supports and is designed as a hollow body.

BRIEF DESCRIPTION OF THE DRAWINGS

The invention will be explained in more detail by means of an exemplary embodiment of a three-phase busbar system represented in the drawings.

The single drawing FIGURE represents an exploded perspective view of a three-phase busbar system.

DESCRIPTION OF PREFERRED EMBODIMENTS

The busbars 40 utilized in the busbar system have a generally square cross section. Continuous T-grooves are cut into exterior longitudinal sides of the busbars 40.

A metal support rail 10 is fastened between two frame legs 50 or mounting rails of a switchgear cabinet, which is designed in a U-shape with a base leg 11 and lateral legs 12 and 13 and which faces the busbars 40, which are to be fastened, with the open side. Threaded bores 14 are cut into the base leg 11 in order to be able to fasten post-shaped supports 15 at desired distances. The supports 15 are made from plastic injection-molded parts and have a square exterior cross section which is selected so that the supports 15 can be placed, fixed against relative twisting, between the lateral legs 12 and 13 of the support rail 10. As the partial section shows, the support 15 is designed as a hollow body which can be unmolded in the direction toward the support rail 10, which has a screw receptacle 16 ending in a fastening sleeve 18 reinforced by an inserted metal sleeve. With the interposition of a shim plate 34 and a spring washer 35, the support 15 can be fastened on the support rail 10 by means of a fastening screw 30 with a shank that ends in a threaded part 31 of a reduced diameter. Here, the transition of the shank to the threaded part 31 of the fastening screw 30 is supported via the spring washer 35 and the shim plate 34 on the transition from the screw receptacle 16 to the fastening sleeve 18 reinforced by the metal sleeve. Longitudinally oriented guide strips 17 for the shank of the fastening screw 30 are formed in the screw receptacle 16, which leave a free space toward the ends of the screw receptacle 16, so that the screw head 32 of the fastening screw 30 is freely rotatable in the screw receptacle 16. A threaded receptacle 33 is cut into the screw head 32.

When two spaced apart supports 15 form a busbar receptacle, having a width matched to the width of the busbar 40, a base plate 19, which is matched to the width of the busbar receptacle, is inserted between the two supports 15. Leg projections 21 are formed on the edges parallel with the longitudinal direction of the support rail 10 and partially extend over the facing exterior sides of the two adjoining supports 15. In this way the H-shaped base plate 19 is captively held on the supports 15, but can be displaced vertically in the busbar receptacle and brought to rest against the support rail 10. The leg projections 21 then rest on the front faces of the lateral legs 12 and 13 of the support frame 10 and cover the front faces in an insulating manner. In addition, covering sections 20 are formed on the leg projections 21, which cover the exteriors of the lateral legs 12 and 13 of the support rail 10.

The height of the supports 15 corresponds to the height of the busbar 40, so that, after insertion into the busbar receptacle prepared in this manner, the busbar 40 terminates flush with the free ends of the supports 15 connected with the support rail 10. The busbar receptacle is then closed by means of a strip 23 having two strip receivers 24 for strip fastening screws 36. The strip receivers 24 are countersunk to receive the screw head of the strip fastening screws 36 in a flush manner. The strip fastening screws 36 are passed through a spring washer 38 and a shim plate 37 and are supported on the strip 23. The threaded portions are screwed into the threaded receptacles 33 of the fastening screws 30, so that the strip 23 is fastened on the supports 15 and fixes the busbar 40 in place in the busbar receptacle.

As the partial rear view of the strip 23 shows, the side of the strip 23 facing the supports 15 is recessed and embodied as a hollow body, which is only reinforced, or respectively closed, by the walls 26.

What is claimed is:

1. In a device for attaching busbars having a rectangular cross section on a support rail by electrically non-conducting support elements, which can be connected with the support rail and form a busbar receptacle adapted to the rectangular cross section of one of said busbars, the improvement comprising:

two post-shaped supports (15) corresponding to each said busbar (40) attached on the support rail (10), spacing between the supports (15) being matched to a width of the busbar (40), the supports (15) having a height corresponding to a height of the busbar (40), the busbar (40) terminating flush with a free end of each of the two supports (15), a base plate (19) arranged between the supports (15), the base plate (19) insulating the busbar receptacle against the support rail (10), the base plate (19) being captively held between the supports (15), and a strip (23) closing ends of the supports (15) facing away from the support rail (10).

2. In the device in accordance with claim 1, wherein the supports (15) have a square exterior cross section and are placed, fixed against twisting, in the support rail (10) which has a U-shaped cross section.

3. In the device in accordance with claim 2, wherein the supports (15) have a screw receptacle (16) which, facing the support rail (10), makes a transition via a step into a fastening sleeve (18) reinforced by an inserted metal sleeve, a fastening screw (30) ending in a threaded part (31) matched to the fastening sleeve (18) and engageable within a threaded bore (14) of the support rail (10), the fastening screw (30) insertable into the screw receptacle (16), and the fastening screw (30) having a threaded receptacle (33) for a strip fastening screw (36) in a screw head (32) facing the strip (23).

4. In the device in accordance with claim 3, wherein the support (15) is embodied as a hollow body around the screw receptacle (16) and the fastening sleeve (18).

5. In the device in accordance with claim 3, wherein the screw receptacle (16) has a plurality of longitudinally-oriented guide strips (17) which reduce a diameter of the screw receptacle (16) to a shank diameter of the fastening screw (30).

6. In the device in accordance with claim 3, wherein the fastening screw (30) is supported on the fastening sleeve (18) of the support (15) by a shim plate (34) and a spring washer (35), and the strip fastening screw (36) is supported via a shim plate (37) and a spring washer (38) flush in a strip receiver (24) having a countersink.

7. In the device in accordance with claim 6, wherein the support (15) is embodied as a hollow body around the screw receptacle (16) and the fastening sleeve (18).

8. In the device in accordance with claim 7, wherein the screw receptacle (16) has a plurality of longitudinally-oriented guide strips (17) which reduce a diameter of the screw receptacle (16) to a shank diameter of the fastening screw (30).

9. In the device in accordance with claim 8, wherein the base plate (19) has an H-shape with leg projections (21) at least partially covering exteriors of adjoining said supports (15) extending parallel with a longitudinal direction of the support rail (10).

10. In the device in accordance with claim 9, wherein the base plate (19) has a plurality of cover sections (20) on the leg projections (21) facing the support rail (10) which cover exteriors of a plurality of lateral legs (12, 13) of the U-shaped support rail (10).

11. In the device in accordance with claim 10, wherein the strip (23) is recessed around a plurality of strip receivers (24) on a side facing the supports (15) and is designed as a hollow body.

12. In the device in accordance with claim 1, wherein the supports (15) have a screw receptacle (16) which, facing the support rail (10), makes a transition via a step into a fastening sleeve (18) reinforced by an inserted metal sleeve, a fastening screw (30) ending in a threaded part (31) matched to the fastening sleeve (18) and engageable within a threaded bore (14) of the support rail (10), the fastening screw (30) insertable into the screw receptacle (16), and the fastening screw (30) having a threaded receptacle (33) for a strip fastening screw (36) in a screw head (32) facing the strip (23).

13. In the device in accordance with claim 12, wherein the fastening screw (30) is supported on the fastening sleeve (18) of the support (15) by a shim plate (34) and a spring washer (35), and the strip fastening screw (36) is supported via a shim plate (37) and a spring washer (38) flush in a strip receiver (24) having a countersink.

14. In the device in accordance with claim 1, wherein the base plate (19) has an H-shape with leg projections (21) at least partially covering exteriors of adjoining said supports (15) extending parallel with a longitudinal direction of the support rail (10).

15. In the device in accordance with claim 14, wherein the base plate (19) has a plurality of cover sections (20) on the leg projections (21) facing the support rail (10) which cover exteriors of a plurality of lateral legs (12, 13) of the U-shaped support rail (10).

16. In the device in accordance with claim 1, wherein the strip (23) is recessed around a plurality of strip receivers (24) on a side facing the supports (15) and is designed as a hollow body.

* * * * *